UNITED STATES PATENT OFFICE.

AKIM TKATSCH, OF LUDWIGSHAFEN, GERMANY, ASSIGNOR TO THE BADISCHE ANILIN & SODA FABRIK, OF SAME PLACE.

AZO DYE.

SPECIFICATION forming part of Letters Patent No. 671,902, dated April 9, 1901.

Application filed November 10, 1900. Serial No. 36,104. (No specimens.)

*To all whom it may concern:*

Be it known that I, AKIM TKATSCH, doctor of philosophy, a subject of the Czar of Russia, residing at Ludwigshafen-on-the Rhine, Kingdom of Bavaria, and Empire of Germany, have invented new and useful Improvements in Azo Dyes from Nitro-Amido-Phenol Sulfo-Acid and Hydroxy-Phenyl-Glycocol Sulfo-Acid IV, of which the following is a specification.

In the German Patent No. 70,788 an amido-phenol sulfo-acid known as "amido-phenol sulfo-acid IV" is described. I have discovered that if this be treated with monochloracetic acid in the presence of sodium acetate a new hydroxy-phenyl-glycocol sulfo-acid is obtained. I call this "hydroxy-phenyl-glycocol sulfo-acid IV." This constitutes a new component for the manufacture of azo dyes by combination with diazo compounds and the like. In particular I have discovered that the azo dye obtained from this new component and diazotized ortho-nitro-ortho-amido-phenol-para sulfo-acid is of value. It dyes wool brown from the acid bath. If the dyed goods be then treated with a chromate, the shade turns to a bordeaux color and possesses a high degree of fastness against the action of milling and does not bleed onto white wool, cotton, or silk during this operation. The fastness against washing and the action of light is also very good.

The following examples will serve to illustrate the manner in which the invention can be carried into practical effect and my new coloring-matter obtained. The parts are by weight:

*Example 1—Production of the new hydroxy-phenyl-glycocol sulfo-acid IV from the amido-phenol sulfo-acid IV.*—Dissolve one hundred and ninety (190) parts of the aforesaid amido-phenol sulfo-acid IV in one thousand (1,000) parts of water. Then dissolve ninety-five (95) parts of monochlor acetic acid in this solution and add to it three hundred and forty (340) parts of crystallized sodium acetate. Boil this mixture for about five (5) hours in a vessel fitted with an inverted condenser. Allow the temperature to fall and subsequently cool the solution thoroughly with the aid of ice. The acid sodium salt of the desired compound separates out. Collect it by filtering it and press it. It is not always necessary to isolate the product in the manner described, as its solution can, if desired, be used directly for the production of azo coloring-matters.

*Example 2—Production of an azo dye from ortho-nitro-ortho-amido-phenol-para sulfo-acid and the new hydroxy-phenyl-glycocol sulfo-acid IV.*—Prepare the diazo compound of the ortho-nitro-ortho-amido-phenol-para sulfo-acid in the well-known way and mix a solution containing about twenty-four (24) parts thereof in a solution of thirty (30) parts of the new hydroxy-phenyl-glycocol sulfo-acid IV, such as can be obtained in accordance with Example 1, in two hundred (200) parts of water containing sufficient calcined soda to render the mixture alkaline. Stir the solution until the combination is complete, precipitate the coloring-matter with common salt, filter, press, and dry.

My new coloring-matter thus obtained dissolves in water, giving a wine-red solution. Upon addition of an excess of carbonate-of-soda solution the shade becomes redder, and its solution in concentrated sulfuric acid is wine-red. It dyes wool from the acid-bath, giving a brown shade which upon treatment with a chromate turns to a bordeaux.

Now what I claim is—

The new coloring-matter that can be obtained by the combination of diazotized ortho-nitro-ortho-amido-phenol-para sulfo-acid and hydroxy-phenyl-glycocol sulfo-acid IV which dyes wool from the acid-bath giving brown shades which upon treatment with bichromate of potassium turn to bordeaux color and which dissolves in water giving a wine-red solution which turns redder upon the addition of an excess of soda and which yields a wine-red solution in concentrated sulfuric acid substantially as described.

In testimony whereof I have hereunto set my hand in the presence of two subscribing witnesses.

AKIM TKATSCH.

Witnesses:
ERNEST F. EHRHARDT,
JACOB ADRIAN.